(12) United States Patent
Benedict et al.

(10) Patent No.: US 9,376,118 B2
(45) Date of Patent: Jun. 28, 2016

(54) ASSESSMENT OF TIRE CONDITION BASED ON A TIRE HEALTH PARAMETER

(71) Applicant: The Goodyear Tire & Rubber Company, Akron, OH (US)

(72) Inventors: Robert Leon Benedict, Tallmadge, OH (US); Thomas Sherwood Fleischman, North Canton, OH (US); Susan Marie Spaeth, Akron, OH (US); Su Xu, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/325,885

(22) Filed: Jul. 8, 2014

(65) Prior Publication Data
US 2016/0009290 A1    Jan. 14, 2016

(51) Int. Cl.
  *B60W 50/14*    (2012.01)
  *B60W 40/12*    (2012.01)

(52) U.S. Cl.
  CPC .............. *B60W 40/12* (2013.01); *B60W 50/14* (2013.01); *B60W 2050/146* (2013.01); *B60W 2530/20* (2013.01)

(58) Field of Classification Search
  CPC .. B60C 23/0408; B60C 11/246; B60C 19/00; B60C 99/006; B60C 11/04; B60C 11/24; B60C 23/007; B60C 23/008; B60C 23/0494; G01M 17/02; G07C 5/008; G07C 5/085; G07C 5/08; G06F 17/5095

USPC ......... 701/2, 29, 31.4, 31.5, 31.9, 420; 703/8; 340/438, 442, 446, 447, 945; 374/143; 152/209.15, 458; 428/402; 73/146, 73/146.5; 248/205.1
See application file for complete search history.

(56) References Cited

U.S. PATENT DOCUMENTS

| | | |
|---|---|---|
| 4,773,011 A | 9/1988 | VanHoose |
| 4,893,110 A | 1/1990 | Hebert |
| 5,463,374 A | 10/1995 | Mendez et al. |
| 5,656,993 A | 8/1997 | Coulthard |
| 5,749,984 A | 5/1998 | Frey et al. |

(Continued)

FOREIGN PATENT DOCUMENTS

| | | |
|---|---|---|
| EP | 1270275 A2 | 1/2003 |
| GB | 2429819 A | 3/2007 |

(Continued)

OTHER PUBLICATIONS

USPTO, Notice of Allowance issued in U.S. Appl. No. 13/828,124 dated Mar. 17, 2015.

(Continued)

*Primary Examiner* — James Trammell
*Assistant Examiner* — Sanjeev Malhotra
(74) *Attorney, Agent, or Firm* — Wood, Herron & Evans, LLP

(57) ABSTRACT

A method and system monitor a plurality of operating parameters for a tire over time during usage of the tire as the tire is exposed to actual operating conditions. The system and method may also determine a tire health parameter for the tire that provides an indication of the condition of the tire based upon the data collected for the tire over time during usage of the tire. The plurality of operating parameters includes, in the least, a temperature associated with the tire during usage of the tire and a duration of usage of the tire.

8 Claims, 7 Drawing Sheets

(56) References Cited

U.S. PATENT DOCUMENTS

| | | |
|---|---|---|
| 5,780,733 A | 7/1998 | Meunier |
| 5,801,306 A | 9/1998 | Chamussy et al. |
| 5,886,624 A | 3/1999 | Hebert |
| 5,895,846 A | 4/1999 | Chamussy et al. |
| 5,900,809 A | 5/1999 | Hebert |
| 6,118,369 A | 9/2000 | Boesch |
| 6,246,317 B1 | 6/2001 | Pickornik et al. |
| 6,636,790 B1 | 10/2003 | Lightner et al. |
| 6,662,642 B2 | 12/2003 | Breed et al. |
| 6,672,149 B2 | 1/2004 | Hottebart et al. |
| 6,711,505 B2 | 3/2004 | Nakao |
| 6,741,169 B2 | 5/2004 | Magiawala et al. |
| 6,809,637 B1 | 10/2004 | Brown |
| 6,836,708 B2 | 12/2004 | Tripathi |
| 6,868,358 B2 | 3/2005 | Brown, Jr. |
| 6,876,908 B2 | 4/2005 | Cramer et al. |
| 6,879,893 B2 | 4/2005 | Woodard et al. |
| 6,879,938 B2 | 4/2005 | Asano et al. |
| 6,883,962 B2 | 4/2005 | Kurata |
| 6,917,285 B2 | 7/2005 | Boulot |
| 6,973,824 B2 | 12/2005 | Giustino et al. |
| 6,988,026 B2 | 1/2006 | Breed et al. |
| 7,009,507 B2 | 3/2006 | Naito |
| 7,043,973 B2 | 5/2006 | Shepherd et al. |
| 7,075,421 B1 | 7/2006 | Tuttle |
| 7,103,460 B1 | 9/2006 | Breed |
| 7,103,760 B1 | 9/2006 | Billington et al. |
| 7,221,262 B2 | 5/2007 | Kuchler |
| 7,272,536 B2 | 9/2007 | Potts |
| 7,301,445 B2 | 11/2007 | Moughler |
| 7,320,246 B2 | 1/2008 | Schick et al. |
| 7,323,975 B2 | 1/2008 | Hall et al. |
| 7,421,321 B2 | 9/2008 | Breed et al. |
| 7,444,210 B2 | 10/2008 | Breed et al. |
| 7,543,489 B2 | 6/2009 | Abe et al. |
| 7,555,370 B2 | 6/2009 | Breed et al. |
| 7,563,021 B2 | 7/2009 | Ichihara et al. |
| 7,594,433 B2 | 9/2009 | Bondu |
| 7,616,106 B2 | 11/2009 | Shoyama et al. |
| 7,630,802 B2 | 12/2009 | Breed |
| 7,657,504 B2 | 2/2010 | Jing et al. |
| 7,729,823 B2 | 6/2010 | Ruoppolo |
| 7,751,955 B2 | 7/2010 | Chinnadurai et al. |
| 7,783,507 B2 | 8/2010 | Schick et al. |
| 7,786,864 B1 | 8/2010 | Shostak et al. |
| 7,908,928 B2 | 3/2011 | Vik et al. |
| 8,009,027 B2 | 8/2011 | Thomas et al. |
| 8,011,236 B2 | 9/2011 | Branger |
| 8,494,704 B2 | 7/2013 | Hall et al. |
| 2001/0002451 A1 | 5/2001 | Breed |
| 2002/0044050 A1 | 4/2002 | Derbyshire et al. |
| 2002/0075145 A1 | 6/2002 | Hardman et al. |
| 2002/0092345 A1 | 7/2002 | Van Niekerk et al. |
| 2002/0130771 A1 | 9/2002 | Osborne et al. |
| 2002/0143421 A1 | 10/2002 | Wetzer |
| 2002/0196138 A1* | 12/2002 | Kogure ............... B60C 23/0408 340/442 |
| 2003/0006890 A1* | 1/2003 | Magiawala ......... B60C 23/0408 340/438 |
| 2003/0006893 A1 | 1/2003 | Dunbridge et al. |
| 2003/0009270 A1 | 1/2003 | Breed |
| 2003/0214394 A1 | 11/2003 | Behrendsen |
| 2004/0130442 A1 | 7/2004 | Breed et al. |
| 2004/0224153 A1* | 11/2004 | Fogal, Sr. ................ B60C 19/00 428/402 |
| 2005/0125117 A1 | 6/2005 | Breed |
| 2005/0192727 A1 | 9/2005 | Shostak et al. |
| 2005/0203683 A1 | 9/2005 | Olsen et al. |
| 2005/0273218 A1 | 12/2005 | Breed et al. |
| 2006/0010961 A1 | 1/2006 | Gibson et al. |
| 2006/0025897 A1 | 2/2006 | Shostak et al. |
| 2006/0071766 A1 | 4/2006 | O'Brien et al. |
| 2006/0093015 A1 | 5/2006 | Ichihara et al. |
| 2006/0122747 A1 | 6/2006 | Brown |
| 2007/0013502 A1 | 1/2007 | Park et al. |
| 2007/0073456 A1* | 3/2007 | Kabe ....................... B60C 19/00 701/31.4 |
| 2007/0135179 A1 | 6/2007 | Hardman et al. |
| 2007/0186634 A1 | 8/2007 | Burghardt et al. |
| 2007/0222568 A1 | 9/2007 | Morar et al. |
| 2007/0251310 A1 | 11/2007 | Pompier |
| 2007/0279203 A1 | 12/2007 | Thomas et al. |
| 2007/0296568 A1* | 12/2007 | Uehara ............... B60C 23/0408 340/446 |
| 2008/0018441 A1 | 1/2008 | Orrell |
| 2008/0046149 A1 | 2/2008 | Breed |
| 2008/0062004 A1 | 3/2008 | Hammerschmidt |
| 2008/0135152 A1* | 6/2008 | Nakajima ............. B60C 9/0042 152/458 |
| 2008/0216567 A1* | 9/2008 | Breed .................... B60C 11/24 73/146.5 |
| 2008/0284577 A1* | 11/2008 | Juzswik ............. B60C 23/0408 340/447 |
| 2009/0218459 A1* | 9/2009 | Durif .................. B60C 23/0408 248/205.1 |
| 2009/0254240 A1 | 10/2009 | Olsen, III et al. |
| 2010/0131147 A1* | 5/2010 | Donnelli ................. G07C 5/085 701/31.4 |
| 2010/0132445 A1* | 6/2010 | Tozawa ............... B60C 23/0408 73/146 |
| 2010/0148950 A1* | 6/2010 | Yamaguchi .......... G01L 19/0609 340/442 |
| 2010/0185414 A1 | 7/2010 | Yamamoto |
| 2010/0207754 A1 | 8/2010 | Shostak et al. |
| 2010/0256946 A1 | 10/2010 | Carresjo et al. |
| 2010/0318335 A1* | 12/2010 | Martin ................ G06F 17/5009 703/8 |
| 2011/0043354 A1* | 2/2011 | Shepler ................. B60C 23/007 340/447 |
| 2011/0140876 A1 | 6/2011 | Deniau |
| 2011/0184669 A1 | 7/2011 | Liberge et al. |
| 2012/0010776 A1* | 1/2012 | Paturle ................ B60C 11/0306 701/31.5 |
| 2012/0038492 A1* | 2/2012 | Maggiore ............... G07C 5/008 340/945 |
| 2012/0160382 A1* | 6/2012 | Okabe ...................... B60C 11/01 152/209.15 |
| 2013/0046418 A1* | 2/2013 | Anderson ............... G07C 5/085 701/2 |
| 2013/0325323 A1* | 12/2013 | Breed .................... G01C 21/34 701/420 |
| 2014/0010265 A1* | 1/2014 | Peng ........................ G01L 17/00 374/143 |
| 2014/0067193 A1* | 3/2014 | Gokyu ................. B60C 11/246 701/31.9 |
| 2014/0277910 A1* | 9/2014 | Suh ......................... B60C 23/02 701/31.4 |

FOREIGN PATENT DOCUMENTS

| | | |
|---|---|---|
| WO | 2009073945 A1 | 6/2009 |
| WO | 2012020166 A1 | 2/2012 |

OTHER PUBLICATIONS

X. Allan Zhong, Computational Fracture Mechanics Analysis of Truck Tire Durability, Journal of Applied Mechanics, Sep. 2006, vol. 73, 799.

Integrated Vehicle tire Pressure Monitoring for Commercial Vehicles, 2005 American Standard, www.wabco-auto.com_fileadmin_Documents_Media_Center_Press_Releases_IVTM.

O'Connor, Mary Catherine, Michelin Shrinks Its eTire Pressure Monitor, RFID Journal, Jan. 8, 2007.

European Search Report, European Search Report, Application No. 14159083.6-1760/2777957, dated Nov. 10, 2014.

USPTO, Office Action issued in U.S. Appl. No. 13/828,124 dated Nov. 5, 2014.

\* cited by examiner

ASSESSMENT OF TIRE CONDITION BASED ON A TIRE HEALTH PARAMETER

FIELD OF THE INVENTION

The invention is generally related to tire maintenance, and in particular to a condition of a tire utilized therein.

BACKGROUND OF THE INVENTION

The tires used by most land based vehicles may occasionally experience issues such as leaks or even complete depressurizations. Such issues may arise, for example, as a result of tire misuse such as overloading, failure to inspect, failure to maintain recommended air pressure, failure to rotate and/or retread at recommended intervals, etc. Due to such types of misuse, the overall condition of a tire may therefore change over time.

As with many other components of a vehicle, accumulated mileage, e.g., as measured using a vehicle odometer, is often used to determine when to inspect and/or perform maintenance activities on a tire. In many instances, the inspection and maintenance activities are primarily directed towards addressing tread wear, as the tread depth of a tire decreases with usage, and proper maintenance activities such as rotating tires and setting proper vehicle alignment can often reduce the rate and increase the uniformity of tread wear, thereby extending the length of time a tire can be used before a recommended minimum tread depth is reached.

Furthermore, while tread wear is one factor associated with the overall condition of a tire, it is not the sole factor, so in many cases, the condition of a tire is not solely based on accumulated mileage and/or the current tread depth for the tire. Rather, the condition of a tire may be considered in some instances to based upon both the condition of the tire treads and the condition of the tire casing, so additional factors such as ambient temperature, cavity temperature, tire pressure, vehicle load, tire position (i.e., where the tire is on a vehicle), frequency of rotation and other tire maintenance, and driving style can have a significant impact on the overall condition of a tire. As a result, one tire of a particular model that is on a vehicle that is lightly loaded and run in a temperate climate, and that is routinely rotated and maintained at a recommended tire pressure, may have a different overall condition than another tire of the same model that has the same accumulated mileage, but that is used on a vehicle that is heavily loaded, run on poor roads in a tropical environment, and rarely if ever rotated and pressurized to the recommended tire pressure.

A need therefore exists in the art for an improved manner of assessing the condition of a tire based on the actual operating conditions to which the tire is exposed.

SUMMARY OF THE INVENTION

The invention disclosure addresses these and other problems associated with the prior art by providing a method and system that utilize a tire health parameter for the tire to assess the condition of the tire. In many embodiments consistent with the invention, the tire health parameter for the tire is based on the exposure of the tire to actual operating conditions, and may be determined, for example, based on a monitored temperature of the tire and the tire's duration of use. Doing so may enable a more accurate assessment of the condition of the tire.

Therefore, consistent with one aspect of the invention, an apparatus includes a processor and program code configured for execution by the processor to determine a tire health parameter for the tire that provides an indication of a condition for the tire based upon the data collected for the tire over time during usage of the tire. The tire health parameter is based upon a plurality of operating parameters collected over time during usage of the tire. The plurality of actual operating parameters includes a temperature associated with the tire during usage of the tire and a duration of usage of the tire. The tire health parameter is an indicator of the condition of the tire.

Further features and advantages of the invention, as well as the structure and operation of various embodiments of the invention, are described in detail below with reference to the accompanying drawings. The invention is not limited to the specific embodiments described herein. The embodiments are presented for illustrative purposes only and so that readers will have multiple views enabling better perception of the invention, which is broader than any particular embodiment. Additional embodiments will be apparent to persons skilled in the relevant art(s) based on the teachings set forth in this patent document.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the pertinent art to make and use the present invention. Various embodiments of the present invention are described below with reference to the drawings, wherein like reference numerals are used to refer to like elements throughout.

DETAILED DESCRIPTION

Figure 1:
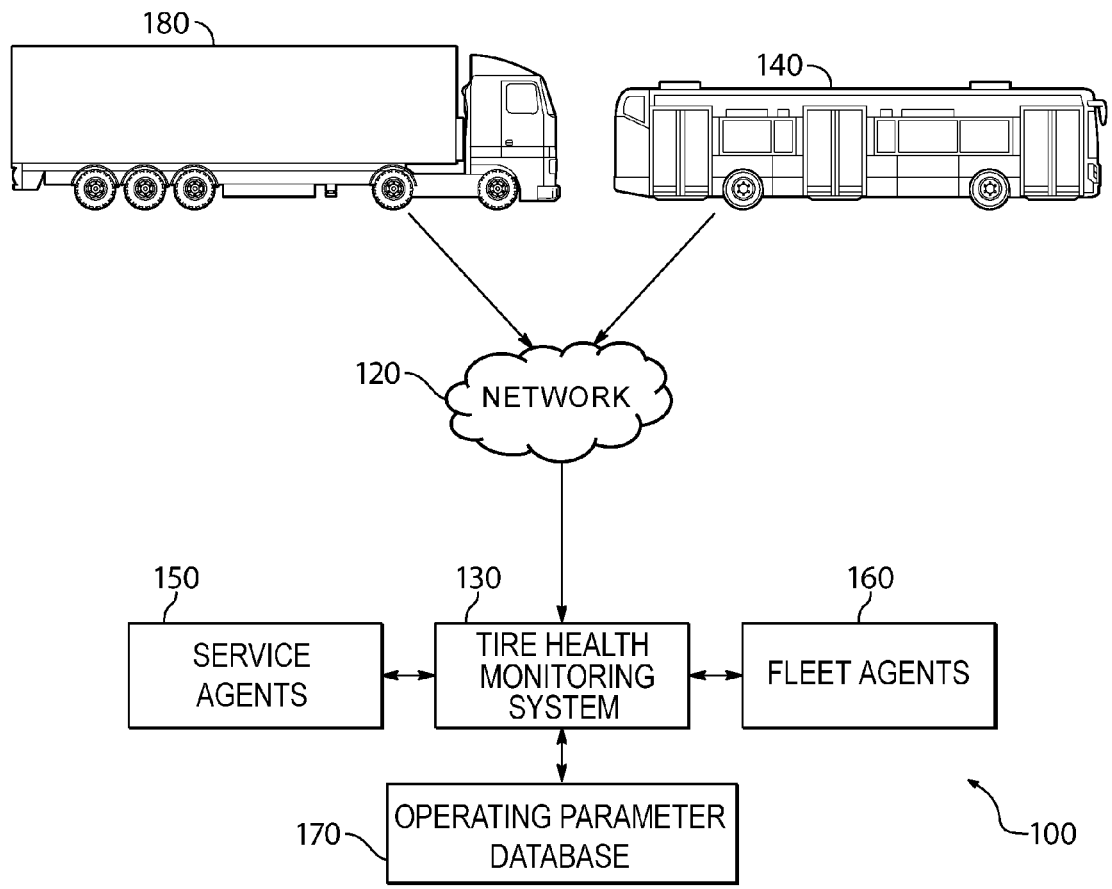
FIG. 1 is a block diagram an exemplary tire health monitoring network environment implemented as a tire health monitoring system capable of monitoring a plurality of vehicles, e.g., a tractor trailer and a bus in accordance with embodiments of the present invention.

Embodiments consistent with the invention facilitate operation for an apparatus to assess a condition of a tire that is based on the exposure of the tire to actual operating conditions, rather than simply based solely on duration-based metrics as has traditionally been the case.

In particular, traditionally an assumption has been made that the age (e.g., based on the manufacturing time) and/or the distance a vehicle travels while a tire is installed on the vehicle are primary determinants of the relative health or condition of the tire. The condition of a tire, in turn, is generally reflective of the overall changes that occur in the materials forming the structure of the tire. For example, as the usage of a tire increases, the treads wear down and the properties of the various materials forming the structure of the tire change, and as a result, the overall condition of the tire changes. Tires, as with most manufactured products, have a finite lifetime, and as a result, as the condition of a tire changes over time, the tire approaches the end of its serviceable life.

It has been found that the rate of this change is roughly proportional to the distance a vehicle travels while the tire is installed on the vehicle. This distance is referred to herein as the "actual mileage" for the tire, although it will be appreciated that "mileage" is not required to be specified in units of miles, but may be specified in other units such as kilometers, feet, etc. Conventionally, when a new tire is installed on a vehicle, the vehicle's current odometer reading may be logged, and then as the vehicle is used, the difference between the current odometer reading and the logged odometer reading may be used to determine a duration of use for the tire, e.g., in terms of miles or kilometers.

Tire manufacturers have conventionally recommended tire maintenance, retread and/or replacement be performed on a tire based on the tread depth of the tire or the actual mileage of the tire. For example, a tire manufacturer may recommend that tires be rotated every 10,000 miles, or may recommend replacement or retreading of a particular model of tire at a particular tread depth. A tire manufacturer typically determines recommended mileages/tread depths for maintenance and/or replacement through exhaustive testing conducted during the development process for a particular model of tire. In addition, some manufacturers assign tire ratings to specific tire models in units of miles (e.g., 50,000 miles), with the tire ratings providing relative indications of the expected operational lifetime of the tire models.

Testing of tires to determine tire ratings is typically performed to simulate nominal operating conditions for a nominal tire. A nominal tire represents a tire with a structure that satisfies the design specifications of a particular model of tire. Nominal operating conditions represent typical operating conditions to which a particular model of tire is expected to be subjected during operational use.

For example, nominal operating conditions for a type of tire that is used on a fleet vehicle such as an 18 wheel semi-trailer truck may be based on typical loads associated with 18 wheel semi-trailer trucks as well as typical operating conditions such as average speeds, typical driving conditions (city v. highway), typical road conditions, etc.

However, it has been found that the actual operating conditions that a tire is exposed to during operational use may differ significantly from the nominal operating conditions from which the tire rating is determined. In some instances, the condition of the tire may change at a significantly faster rate when the tire is exposed to the harsher operating conditions, while in other instances, the condition of the tire may change at a slower rate when the tire is exposed to less severe operating conditions. Consequently, the tire rating may not in actuality provide a reasonable estimate of the operational lifetime of a tire that is not subjected to nominal operating conditions. As a result, assessing the condition of a tire based solely on the actual mileage of the tire may result in an inaccurate assessment when the tire is exposed to the actual operating conditions that are significantly different from nominal operating conditions.

For example, a particular local delivery truck in Florida that is regularly driven in hotter temperatures and in stop-and-go traffic, on poor quality roads, and driven by an aggressive driver that relies on quick starts and stops, may induce comparatively greater changes in condition to a tire than another delivery truck operated in a more temperate climate, on well paved roads and driven in a more cautious manner. Thus, for example, if a tire is rated for 50,000 miles, a tire in the former example may require maintenance and/or replacement earlier than 50,000 miles while a tire in the latter example may be usable beyond the rated mileage. The actual operating conditions may include but are not limited to temperature, load, severity of the terrain, precipitation, vehicle speed, operator driving style, traffic conditions, road conditions and/or any other actual operating condition that may impact how quickly a tire changes or wears out.

In contrast with conventional approaches, however, embodiments consistent with the invention take into account one or more operating parameters associated with usage of a tire to provide a more accurate assessment of the actual condition of a tire than can be attained solely through reliance on the actual mileage of a tire. In some embodiments, for example, a tire health parameter may be generated for a tire to provide a metric that represents an actual condition of the tire that is not solely based upon the actual mileage of the tire.

In some embodiments, a tire health parameter may be specified in terms of an effective or equivalent mileage that departs from the actual mileage of the tire to account for changes in the condition of the tire resulting from exposure to actual operating conditions that differ (e.g., are more or less severe) from nominal operating conditions. Thus, for example, in the former example above, as a result of more severe operating conditions, an equivalent mileage of 55,000 miles might be determined for a tire that has been used for only 40,000 actual miles, such that if the tire is rated for 50,000 miles, a determination may be made to replace the tire at 40,000 miles due to the increased wear and service represented by the equivalent mileage. Alternatively, if a tire has been subjected to less severe operating conditions, an equivalent mileage of 35,000 miles might be determined to reflect a potential increased operational lifetime beyond the 50,000 mile tire rating.

A tire health parameter for a tire may provide a more accurate representation of the condition of the tire so that maintenance and/or need for replacement decisions for the tire may be properly assessed. In some embodiments, rather than scheduling maintenance for a tire based on actual mileage, maintenance may be performed on the tire based on the tire health parameter such that tires that are subject to more severe operating conditions may be serviced sooner. Assessing tire maintenance based on the tire health parameter thus takes into account any increase or decrease in change of the condition of the tire due to more or less severe operating conditions.

Further, representing the tire health parameter for a tire in terms of effective or equivalent mileage (e.g., miles or kilometers) may provide a comprehensible metric for the tire that accurately represents the condition of the tire in terms that are understandable to owners, mechanics, and others in the automotive industry. Translating the condition of a tire into an effective or equivalent mileage provides a metric representing the condition of the tire that the tire owner as well as tire mechanics can understand and easily assess maintenance requirements for the tire. The tire health parameter also provides such individuals with an understanding of how much life of the tire has been used and how much life of the tire is remaining based on the condition of the tire represented by the tire health parameter.

It will be appreciated, however, that a tire health parameter consistent with the invention need not necessarily be represented in terms of equivalent or effective mileage. In other embodiments, a tire health parameter may be represented in terms of remaining mileage, while in still other embodiments, a tire health parameter may be represented in other units. For example, a tire health parameter may be represented in terms of percentages or a relative rating such as a number between 1-10, a letter grade, or another suitable indicator for relative health.

In order to determine a tire health parameter, embodiments consistent with the invention may monitor one or more operating parameters for a tire during usage of the tire over time as the tire is exposed to actual operating conditions. In some embodiments, the plurality of operating parameters may include one or more temperatures, as well as a duration, e.g., actual mileage or another metric related to the duration, e.g., in terms of time and/or distance, that a tire has been in operational use. The operating parameters result from the exposure of the tire to the actual operating conditions, and thus may be representative of the actual condition of the tire. For example, operating parameters monitored from the tire regarding the cavity air temperature of the tire as the tire is exposed to the actual operating conditions have been found to provide an indication of the actual condition of a tire, as it has been found that the condition of a tire may change more quickly when the tire has been subjected to higher than nominal cavity air temperatures during use.

Some embodiments of the invention, as noted above, determine a tire health parameter that represents an effective or equivalent mileage (e.g., in miles or kilometers) that attempts to reflect the actual condition of a tire and/or the expected remaining useful lifetime of a tire. As also noted above, the equivalent mileage for a tire may provide a comprehensible metric that represents the condition of the tire in terms that are understandable to owners, mechanics and others in the automotive industry.

It will be appreciated that concept of a healthy or unhealthy tire, and the concept of the probability or likelihood of a tire being subject to depressurization may vary in different embodiments. As a result, a tire health parameter may also vary in different embodiments, and may vary for different brands, models, structures, types and compositions of tires.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hardware and Software Environment

Turning now to the drawings, wherein like numbers denote like parts throughout the several views, FIG. 1 illustrates an exemplary tire health monitoring network environment 100 implemented as a tire health monitoring system 130 capable of monitoring a plurality of vehicles, e.g., a tractor trailer 180 and a bus 140. It will be appreciated that tire health monitoring system 130 may be capable of monitoring the tires of practically any type of vehicle, including, for example, passenger vehicles, cars, trucks, vans, construction equipment, agricultural equipment, and/or any other vehicle with tires that may require tire health monitoring as will occur to those of skill in the art so the invention is not limited to the particular vehicles illustrated in FIG. 1.

Tire health monitoring system 130 wirelessly communicates with vehicles 180, 140 via a network 120, e.g., via a wireless carrier, which may be operated by the same entity that operates tire health monitoring system 130, or by a separate entity altogether, and may be public, private, or proprietary in nature. Tire health monitoring system 130 may be coupled to network 120 by wired and/or wireless communication media.

Tire health monitoring system 130 is coupled to an operating parameter database 170 that is used to store tire pressure monitoring system (TPMS) data retrieved from vehicles 180, 140, e.g., pressure, temperature, a vehicle identifier, a tire identifier, a wheel identifier, location data and/or a timestamp. Additional data, e.g., temperature data from other sensors, may also be stored in an operating parameter database in some embodiments. Moreover, tire health monitoring system 130 may be accessed by various entities, including, for example, service agents 150 that are either agents of the provider of tire health monitoring system 130 or authorized representatives thereof, e.g., authorized dealers and/or service centers. Moreover, in some embodiments that monitor on behalf of fleets of vehicles, fleet agents 160 may also be provided with access to tire health monitoring system 130. Additional interfaces, e.g., for vehicle operators or owners, administrators, etc., may also be provided in some embodiments of the invention. In addition, it will be appreciated that in some embodiments, tire health monitoring may be implemented solely in electronics located on-board a vehicle, without any communication of data to a remote service, and with a vehicle operator being notified of a tire condition via a display in the vehicle.

Figure 2:
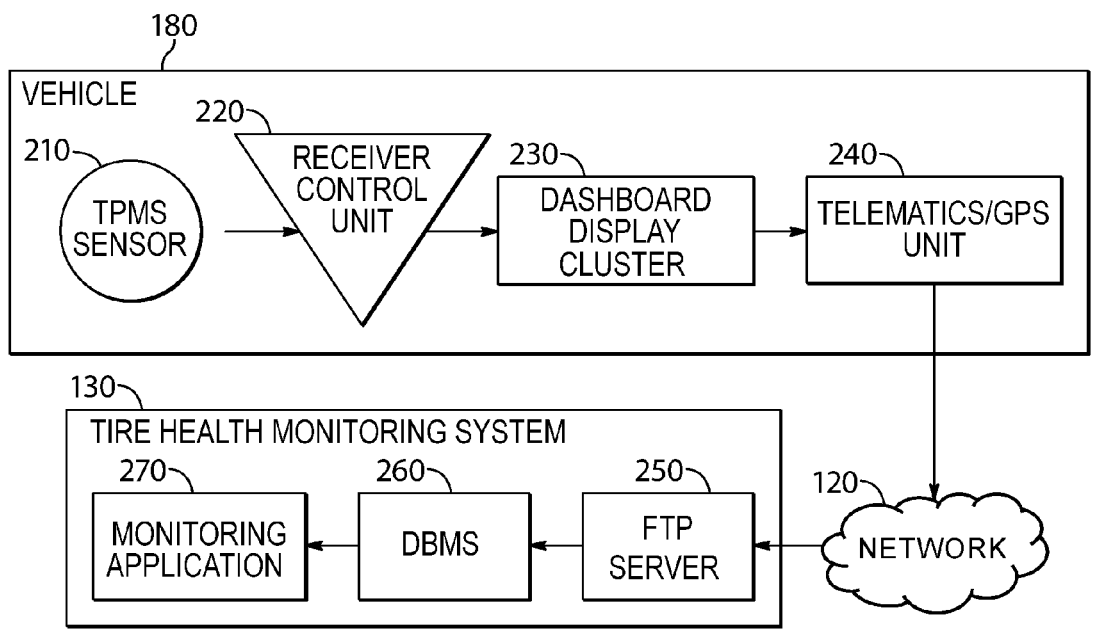
FIG. 2 illustrates in greater detail the components in the tire health monitoring network environment used to retrieve, communicate and process TPMS data in accordance with embodiments of the present invention.

FIG. 2 illustrates in greater detail the components in tire health monitoring network environment 100 used to retrieve, communicate and process TPMS data. For example, on vehicle 180, a plurality of TPMS sensors 210 may be installed on each tire/wheel of the vehicle, and configured to communicate TPMS data to receiver control unit (RCU) 220 disposed on the vehicle. It will be appreciated that multiple RCU's 220 may be disposed in different locations on a vehicle in order to communicate with proximate TPMS sensors 210.

Each RCU 220 typically outputs the TPMS data to a dashboard display cluster 230 on vehicle 180, which may perform some processing of the TPMS data and may report such data to an operator, e.g., pressure readings, temperature readings, and/or low pressure and/or temperature alerts. Cluster 230 may be a programmable electronic or computer device incorporating audio and/or visual indicators or displays, and may be integrated with other on-board electronic components. In some embodiments, e.g., where no central monitoring service is used, a tire health monitoring algorithm as disclosed herein may be performed locally in vehicle 180, e.g., within cluster 230 on another on-board electronic component.

In the illustrated embodiment that does incorporate central monitoring, vehicle 180 also includes a telematics/GPS unit 240 that communicates with network 120 to communicate TPMS data to tire health monitoring system 130. Telematics/GPS unit 240 may be configured to output location data generated by an integrated GPS receiver as well as additional data, including speed and/or distanced traveled data, as well as data collected by sensors 210. It will be appreciated that the data communicated by telematics/GPS unit 240 may be preprocessed in some embodiments or may be raw data. Furthermore, the protocol by which data is communicated to network 120 may vary in different embodiments. Furthermore, in some embodiments, GPS sensing may be omitted. In addition, in some embodiments, bi-directional communication may be supported such that, for example, tire health monitoring system 130 may provide the operator of vehicle 180 with alerts or status information, and may provide a mechanism by which an operator may be put into communication with a service agent, e.g., via electronic message, voice, and/or video communications to address any alert conditions or coordinate service of the vehicle.

Network 120 provides TPMS and other data provided by telematics/GPS unit 240 to tire health monitoring system 130, e.g., by interfacing with an FTP or other server 250. Sever 250 passes the incoming data to a database management system 260 to log the incoming data in operating parameter database 170. This data is then monitored and processed by a monitoring application 270, in the manner discussed in greater detail below. Tire health monitoring system 130 may be a stationary device located on vehicle 180, a stationary device located remote to vehicle 180, a hand-held wireless remote device that may change locations while receiving TPMS data from TPMS sensor 210, and/or any type of device located in any location that is capable of receiving TPMS data from TPMS sensor 210 as will occur to those of skill in the art.

Tire Health Monitoring Network Environment

Figure 3:
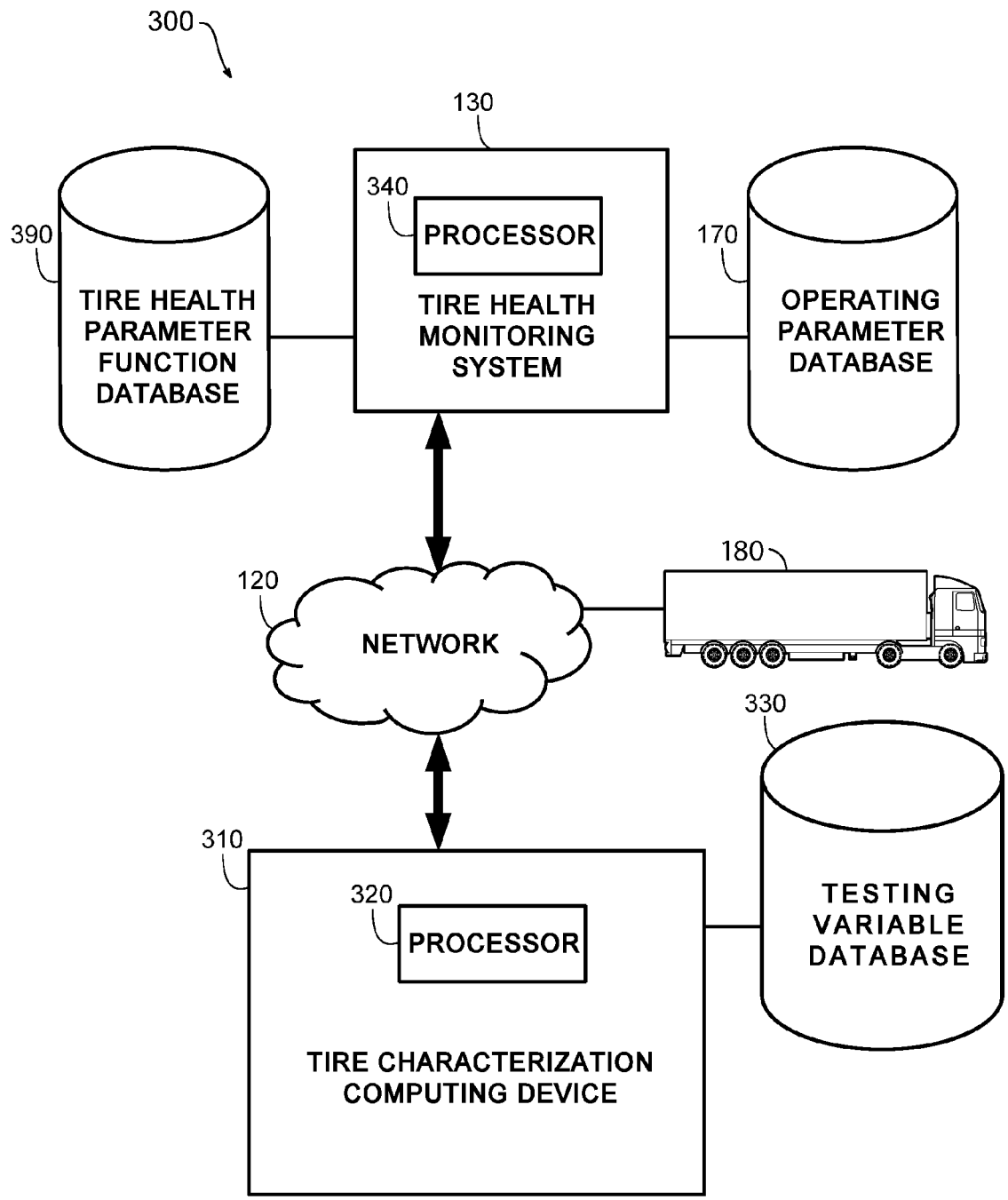
FIG. 3 is a block diagram of an exemplary tire health monitoring network environment in accordance with embodiments of the present invention.

FIG. 3 shows an illustration of a tire health monitoring network environment 300 according to embodiments of the present invention. Tire health monitoring network environment 300 includes tire health monitoring system 130, network 120, operating parameter database 170, a tire health parameter function database 390, a tire characterization computing device 310, a testing variable database 330, and vehicle 180. Tire characterization computing device 310 includes a processor 320 and tire health monitoring system 130 includes a processor 340.

Tire health monitoring network environment 300 may collectively generate a tire health parameter that provides an indicator as to the health of the tire based on parameters and/or values that are relative to the actual operating conditions that the tire has been exposed. The tire is exposed to the actual operating conditions based on usage of the tire by vehicle 180. The parameters and/or values used to generate the tire health parameter may be collected directly from the tire as vehicle 180 operates with the tire and also from a tire characterization of the tire. During the tire characterization, model tires that are similar to the tire may be exposed to nominal operating conditions in a simulated environment, such as in a laboratory. The parameters and/or values generated from the tire characterization may then be used with the operating parameters to generate the tire health parameter.

Tire health monitoring system 130 may monitor one or more tires and collect the operating parameters from one or more vehicles 180. As noted above, one or more vehicles 180 may include TPMS sensors positioned on the one or more tires that may monitor the operating parameters for tire health monitoring system 130 to collect. Tire health monitoring system 130 may store the collected operating parameters in operating parameter database 170. Tire health monitoring system 130 may then retrieve the operating parameters from operating parameter database 170 when tire health monitoring system 130 determines the tire health parameter for the monitored tires to assess the health of the monitored tires. Tire health monitoring system 130 may determine the tire health parameter for each of the monitored tires based on the operating parameters collected from the one or more vehicles 180 as the one or more monitored tires are exposed to the actual operating conditions.

As noted above, the tire health parameter may also be determined from parameters and/or values that are obtained from the tire characterization of the tire rather than collected from the monitored tires themselves. Tire health monitoring system 130 may additionally rely on the parameters and/or values from tire characterization generated by one or more tire characterization computing devices 310. Tire characterization computing device 310 may be remote from tire health monitoring system 130, vehicle 180, and the monitored tires. For example, tire characterization computing device 310 may generate the parameters and/or values from the testing of the model tires in a laboratory environment. Tire characterization computing device 310 may store the parameters and/or values generated from tire characterization in testing variable database 330. Tire characterization computing device 310 may then provide the parameters and/or values to tire health monitoring system 130 when tire health monitoring system 130 generates the tire health parameter for the monitored tires. Thus, tire health monitoring system 130 may customize the tire health parameter to specific models and/or types of tires that are similar to the monitored tires.

One or more tire health monitoring systems 130 may connect to one or more tire characterization computing devices 310 via network 120. Tire health monitoring system 130 may include a data acquisition system, a data management system, intranet, conventional web server, e-mail server, or file transfer server modified according to one embodiment. Tire health monitoring system 130 is typically a device that includes a processor, a memory, and a network interface, hereinafter referred to as a computing device or simply "computer." For example, tire health monitoring system 130 may be a workstation, mobile device, computer, cluster of computers, set-top box, or other computing device. In an embodiment, multiple modules may be implemented on the same computing device. Such a computing device may include software, firmware, hardware, or a combination thereof. Software may include one or more application on an operating system. Hardware can include, but is not limited to, a processor, memory, and/or graphical user interface display.

In an embodiment, tire health monitoring system 130 may stream tire data from vehicle 180 via network 120. Tire health monitoring system 130 may also retrieve tire characterization data from to tire characterization computing device 310 via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

Tire characterization computing device 310 may be any type of processing (or computing device) as described above. For example, tire characterization computing device 310 may be a workstation, mobile device, computer, cluster of computers, set-top box, or other computing device. In an embodiment, multiple modules may be implemented on the same computing device. Such a computing device may include software, firmware, hardware, or a combination thereof. Software may include one or more application on an operating system. Hardware can include, but is not limited to, a processor, memory, and/or graphical user interface display.

Tire characterization computing device 310 may also include a conventional web server, e-mail server, or file transfer server configured to provide functions of the various embodiments of the present disclosure.

Tire characterization computing device 310, tire health monitoring system 130, testing variable database 330, operating parameter database 170, and tire health parameter function database 390 may share resources via network 120. For example, tire health monitoring system 130 may provide operating parameters monitored from the tire to operating parameter database 170. Tire health monitoring system 130 may also retrieve testing operating parameters monitored from the model tire during tire characterization from testing variable database 330 via network 120. Tire characterization computing device 310 may also update testing variable database 330 with operating parameters monitored from the model tire during tire characterization. Based on the cloud computing configuration, the interaction between tire characterization computing device 310, tire health monitoring system 130, testing variable database 330, operating parameter database 170, and tire health parameter function database 390 may not be limited to a single computing device. For example, a plurality of computing devices may update operating parameter database 170 with operating parameters monitored from other tires with similar design specifications as the tire.

Tire health monitoring system 130 may determine a condition of a tire based on previous exposure of the tire to actual operating conditions. Tire health monitoring system 130 may monitor a plurality of operating parameters for the tire over time during usage of the tire. The plurality of operating parameters may include, for example, temperature and duration. The operating parameters may represent the exposure of the tire to actual operating conditions. As a result, the monitoring of the operating parameters may provide an adequate monitoring of exposure of the tire to the actual operating conditions. The condition of the tire is affected when the tire is exposed to severe actual operating conditions. The plurality of operating parameters may represent the impact to the condition of the tire from the plurality of actual operating conditions. Thus, the condition of the tire may correspond to the plurality of operating parameters in that the plurality of operating parameters represents the exposure of the tire to the severity of the actual operating conditions.

A tire health parameter may be determined that provides an equivalent mileage for the tire based on the monitored plurality of operating parameters. The tire health parameter may be an indicator of the condition of the tire. The tire health parameter denotes a health indicator, such as equivalent mileage for example, that the life of the tire has remaining based on the exposure to actual operating conditions rather than the actual mileage of the tire. The tire health parameter provides a status of the tire by providing the equivalent mileage of the tire that may be an adjustment to the actual mileage of the tire to account for the change in condition of the tire due to exposure to actual operating conditions that differ from the nominal operating conditions.

For example, as the tire health parameter increases, the mileage remaining for the life of the tire decreases as the equivalent mileage increases at a faster rate than the actual mileage. As a result, the tire health parameter may correspond to the condition of the tire in that as the tire health parameter increases, the mileage remaining for the life of the tire decreases as the condition of the tire changes. The tire health parameter may be based on the plurality of operating parameters monitored by tire health monitoring system 130. As noted above, the plurality of operating parameters monitored by tire health monitoring system 130 may represent the impact to the condition of the tire from actual operating conditions. The condition of the tire may be assessed based on the tire health parameter.

Determining a Tire Health Parameter for a Tire

Embodiments consistent with the invention utilize a tire health parameter to monitor the health of tires on a particular vehicle. In some embodiments, the tire health parameter may be based at least in part on one or more measured temperatures to which a tire is subjected during actual use, as well as actual mileage to which the tire is subjected during actual use. It is believed, for example, that a relationship exists between the temperature at a belt edge area of a tire and structural fatigue in the tire, and that an indication of the overall health of a tire may be determined based on this temperature and on the accumulated mileage of the tire.

Figure 5:
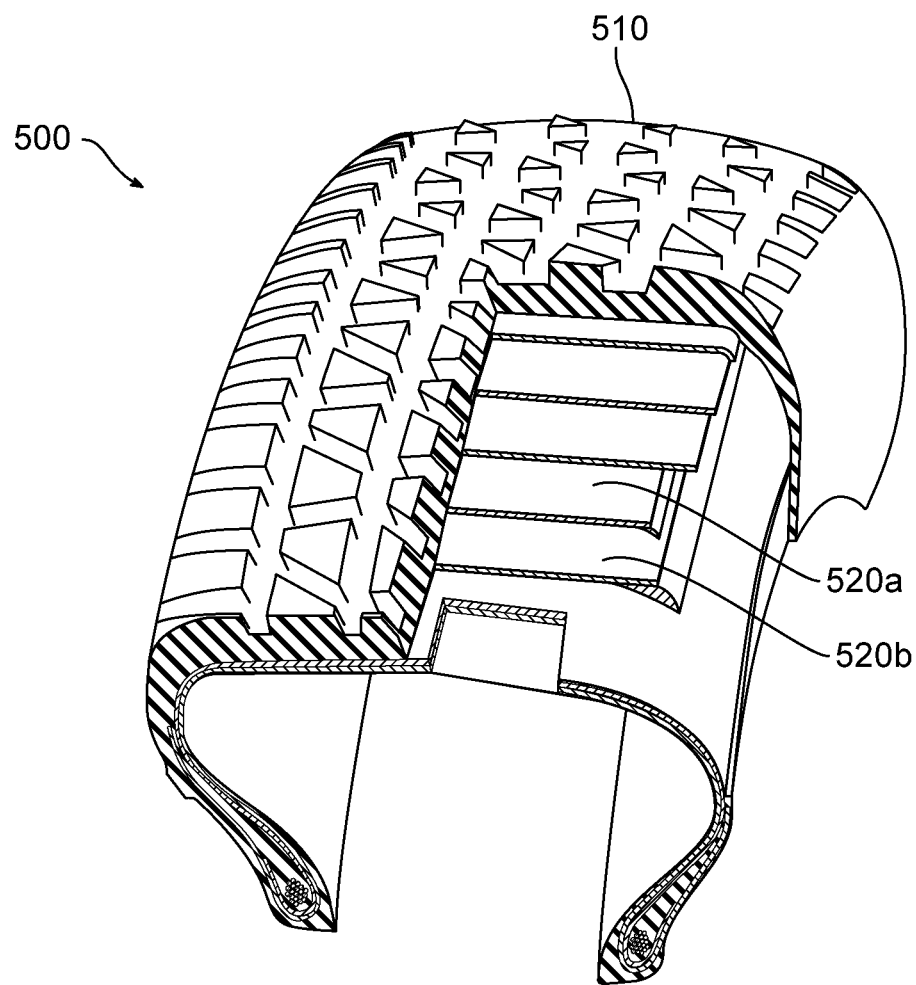
FIG. 5 is a functional diagram of an exemplary tire in accordance with embodiments of the present invention.

FIG. 5, for example, illustrates an example tire 500 including a crown portion 510 along with first and second belts 520a and 520b of the model tire that is exposed to the nominal operating conditions. First belt 520a and second belt 520b are generally located below the surface of crown portion 510, and reinforce the tread of crown portion 510 and maintain the shape of tire 500 against forces such as but not limited to tire inflation pressure forces, centrifugal forces, cornering forces, braking forces, etc. Further, crown portion 510 may also include any quantity of belts as will occur to those of skill in the art. The temperature of this area proximate belts 520a and 520b, e.g., proximate the edge where the widest belts of the tire overlap, during usage of a tire is referred to hereinafter as belt edge temperature.

In one embodiment, a tire health parameter (D) may be determined using Equation (1) below:

$$D = \int \frac{dD}{dn}\bigg|_0 e^{\frac{E_a(T_{be}-T_0)}{R_{gc}(T_{be}T_0)}} dn. \qquad (1)$$

In this embodiment, the tire health parameter (D) may be defined in units of mileage, e.g., in terms of miles or kilometers, which is referred to herein as nominal mileage. Equation (1) effectively accumulates damage, for a tire during usage, and based upon the actual operating conditions to which the tire is exposed during use. In this equation, $T_{be}$ refers to a belt edge temperature value, $T_0$ refers to a reference temperature value, $E_a$ refers to an activation energy value, and $R_{gc}$ refers to the gas constant. The term "n" is used hereinafter to refer to actual or accumulated mileage, and do refers to accumulated mileage over a measurement interval, while the term $dD/dn|_0$ refers to a nominal tire health constant representing a nominal amount of damage per mile.

In some embodiments, the belt edge temperature value $T_{be}$ may be determined directly, e.g., by using a temperature sensor, thermocouple or other temperature measuring device capable of measuring the temperature in the belt edge area of the tire. In other embodiments, however, the belt edge temperature value may be derived from a cavity air temperature in the interior of the tire and an ambient temperature taken external to the tire, e.g., using Equation (2) below:

$$T_{be}=a*T_{cav}+b*T_{amb}, \qquad (2)$$

where $T_{cav}$ and $T_{amb}$ are cavity air and ambient temperatures and a and b are cavity air and ambient coefficients, respectively.

In some embodiments, the cavity air and ambient coefficients may be defined as functions of tread depth (TD), and as such, Equation (2) may be rewritten as Equation (3) below:

$$T_{be}(TD)=a(TD)*T_{cav}+b(TD)*T_{amb}. \qquad (3)$$

Thus, by using either Equation (2) or Equation (3), the belt edge temperature for a tire may be calculated from cavity air and ambient temperatures (and in the case of Equation (3), additionally tread depth).

Returning to Equation (1), therefore, the inputs to this equation include Rgc and $dD/dn|_0$ constants, field-collected data from the tire for which a tire health parameter is to be determined (either the belt edge temperature or the cavity air and ambient temperatures), and a number of characterization values that characterize the particular model or type of the tire. The characterization values are specific to a particular model or type of tire, and include, for example, the reference temperature value ($T_0$) and the activation energy value ($E_a$), and where Equation (2) or Equation (3) is used to determine the belt edge temperature, the cavity air and ambient coefficients (a/b) or functions (a(TD)/b(TD)). As will become more apparent hereinafter, the tire characterization values may be determined through testing of one or more similar tires (referred to hereinafter as model tires), in a process referred to hereinafter as tire characterization. A model tire may be selected so that the model tire has similar design specifications to a tire to be monitored so that the structure of the model tire is similar to the structure of the tire. Selecting the model tire with similar design specifications to the tire may provide a representation of belt interface temperatures for the tire when the tire is exposed to nominal operating conditions. The model tire may include but not limited to model tires of the same make and model as the tire (e.g., sharing the same SKU), similar design specifications as the tire but of different make and model, the same type of vehicle as the tire, and/or any other type of model tire that will occur to those of skill in the art.

For example, to determine the reference temperature value and the cavity air and ambient coefficients, a thermocouple at the belt edge area of a model tire may be used to measure Tbe, while temperature sensors (e.g., thermocouples or TPMS sensors) may be used to measure $T_{cav}$ and $T_{amb}$ during testing of the model tire. Testing may be performed on the three tires with the same SKU having 3 different tread depths (e.g., full, half, minimum) under the same nominal testing conditions to reach a pseudo steady state (e.g., about 2 hours for truck tires). The pseudo steady state temperatures ($T_{be}$, $T_{cav}$ and $T_{amb}$) may then be used to fit "a" and "b" for each TD using Equation (3), thereby generating tread depth-based functions for the cavity air and ambient coefficients (a/b). In addition, the reference temperature value ($T_0$) may be set to the pseudo steady state temperature $T_{be}$ for full tread depth.

To determine the activation energy value ($E_a$), a number of tests may be run with different test conditions using the same SKU to tire removal. Assuming that the total amount of damage a tire takes before removal is the same for the same SKU, it may also be assumed that the total damage/nominal mileage (D) is the same for all of the tested tires, and as such, the activation energy value ($E_a$) may be fit using Equation (1) from the monitored results of the testing. $T_{be}$ history may be calculated based on $T_{cav}$ history (measured) and $T_{amb}$ history (measured) during each test in the manner discussed above, and the actual mileage of the tire during each test may be used as the "n" in Equation (1).

As noted above, the tire health parameter (D) may provide a metric that represents a status of the condition of the tire. The tire health parameter (D) in some embodiments provides the equivalent or nominal mileage of the tire that may be an adjustment to the actual mileage of the tire to account for the change in condition of the tire due to exposure to actual operating conditions that differ (e.g., are more or less severe) than nominal operating conditions. Thus, for example, in the former example above, as a result of more severe operating conditions, an equivalent mileage of 55,000 miles might be determined for a tire that has been used for only 40,000 actual miles, and if the tire is rated for 50,000 miles, a determination may be made to replace the tire at 40,000 miles due to the increased changes in condition represented by the equivalent mileage. One implementation for determining a tire health parameter, specifically in the application of a centralized tire condition monitoring computing device for determining the health of a tire is illustrated by function 400 in FIG. 4.

Figure 4:
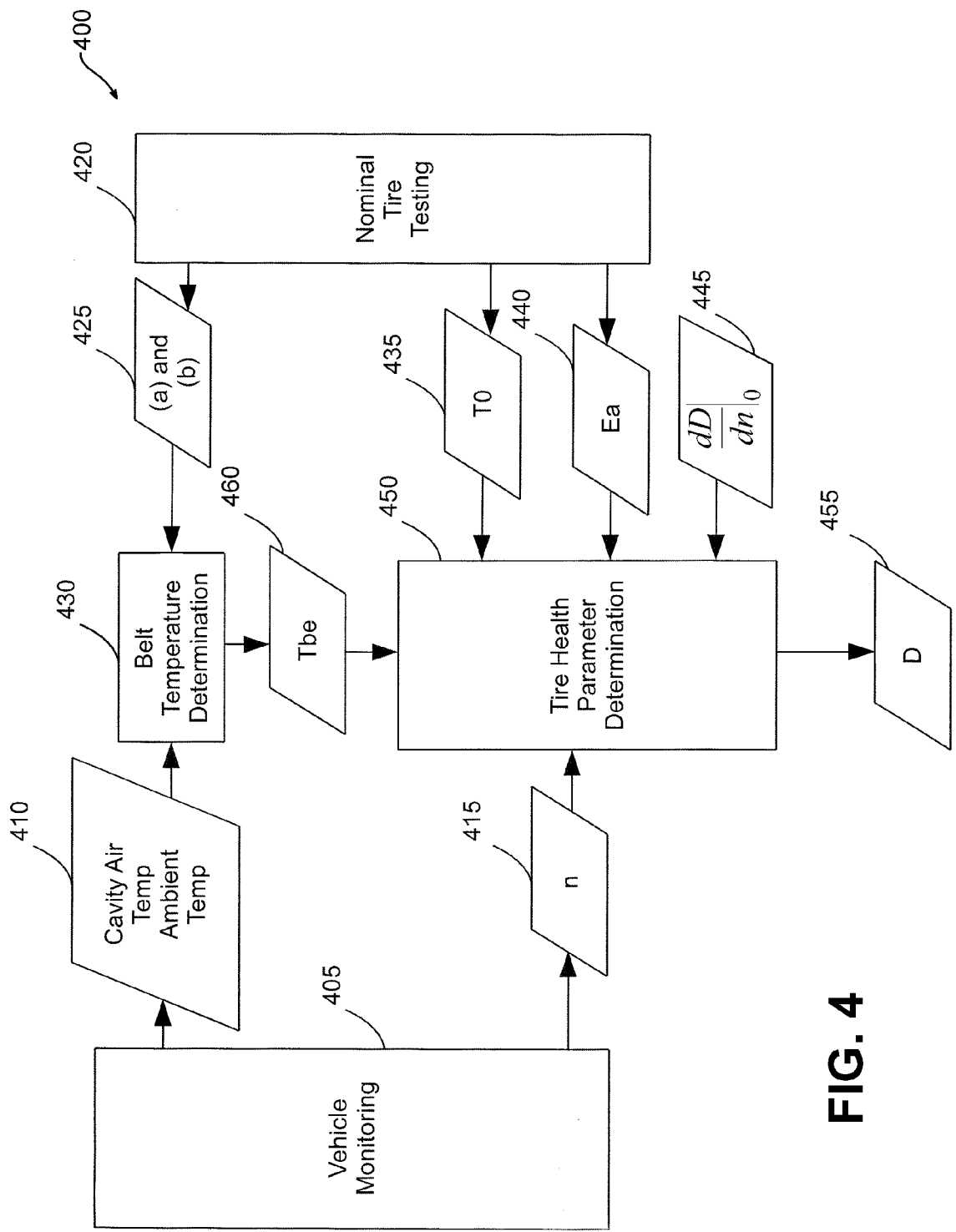
FIG. 4 shows a flow chart illustrating a method of assessing the health of a tire based on previous exposure of the tire to a plurality of actual operating conditions, in accordance with embodiments of the present invention.

To assess the health of a tire, function 400 makes a tire health parameter determination in block 450, and where the belt edge temperature is determined from cavity air and ambient temperatures, function 400 also makes a belt edge temperature determination in block 430. In this implementation, block 450 may utilize Equation (1) above, while block 430 may utilize either of Equations (2) or (3). Thus, as illustrated in FIG. 4, nominal tire testing may be performed in block 420 to determine the various model-specific tire characterization values utilized by these equations, including the cavity air and ambient coefficients (a and b) 425, the reference temperature value ($T_0$) 435, and the activation energy value ($E_a$) 440. In addition, the aforementioned constants, including the nominal tire health constant ($dD/dn|_0$) 445, may also be provided as an input to block 450. During operational monitoring of a tire, which typically occurs after tire testing and characterization, vehicle monitoring is performed as illustrated in block 405, resulting in the collection of operating parameters including cavity air temperature ($T_{cav}$) and ambient temperature ($T_{amb}$) 410 and actual mileage (n) 415. Temperatures 410 are provided to block 430 to determine the belt edge temperature ($T_{be}$) 460, which is provided as an input to block 450. In some embodiments, as noted above, tread depth (TD) may also be collected and utilized by block 430 to determine the belt edge temperature ($T_{be}$) 460. In other embodiments, belt edge temperature may be monitored directly by block 405, and block 430 may be omitted. Block 450 receives the belt edge temperature 460 and actual mileage 415 and generates, using Equation (1), a nominal or effective mileage (D) 455.

Therefore, the operating parameters monitored by tire health monitoring system 130 may provide a metric that represents the exposure of the tire to the actual operating conditions. The operating parameters may be correlated to the condition of the tire in that the operating parameters may represent the impact to the condition of the tire due to the actual operating conditions. The condition of the tire deteriorates when exposed to the actual operating conditions and the operating parameters represent the impact on such deterioration. As a result, the condition of the tire may be based on the operating parameters monitored from the tire.

In an embodiment, the operating parameters measured from the tire may include one or more temperatures collected from the tire as the tire is exposed to the actual operating conditions. As noted in the example above, the range of temperatures that the tire is exposed to may correlate to the condition of the tire where the structural fatigue of the tire increases at a quicker pace when the range of temperatures that the tire is exposed to also increases. When the tire is exposed to elevated temperatures, the elevated temperatures may cause the material compounds of the tire to soften and accelerate chemical change in the material compounds. The mechanical manifestations to the tire based on the degradation of the material compounds may cause a change in the compound modulus of the tire and a reduction of compound fracture toughness that may result in further change in the condition of the tire.

In one embodiment, tire health monitoring system 130 may receive cavity air temperature values 410 from the environment in the cavity of the tire (e.g., as sensed by a TPMS sensor mounted on the tire), and store the measured cavity air temperature values 410 in operating parameter database 170. Tire health monitoring system 130 may also receive ambient temperature values 410 from an environment surrounding the tire and store the measured ambient temperature values 410 in operating parameter database 170. The ambient temperature value 410 of the environment surrounding the tire may be collected via an ambient temperature sensor mounted on the vehicle, via a TPMS sensor, via another sensor located proximate to the tire or elsewhere on the vehicle, and the same ambient temperature reading may be used for all monitored tires in some embodiments. In other embodiments, ambient temperature may be determined from an online weather service based on the current location of the vehicle (e.g., via GPS).

In an embodiment, tire health monitoring system 130 may receive cavity air temperature values and ambient temperature values 410 on a periodic basis, e.g., every 10 minutes. In some embodiments, the values may be measured by sensors on the vehicle at the same rate, while in other embodiments, multiple values may be logged at a faster rate and averaged, compensated or otherwise pre-processed on the vehicle prior to being communicated to system 130. Tire health monitoring system 130 may collect other combinations of operating parameters that may be representative of the condition of the tire, including, for example, tread depth, tire pressure, tire load, speed, vehicle/tire acceleration (lateral, longitudinal and vertical), among others, as will occur to those of skill in the art having the benefit of the instant disclosure.

Tire health monitoring system 130 may also track the actual mileage (n) 415 of the tire, which is the mileage that the tire accumulates based on the revolutions that the tire completes as a vehicle 180 that the tire is associated with travels while being exposed to the actual operating conditions. Typically, the actual mileage (n) 415 is measured using the vehicle odometer, vehicle location (e.g., based on GPS data), or number of tire rotations. Tire health monitoring system 130 may track the actual mileage (n) 415 of the tire as measured by the vehicle odometer and store the actual mileage (n) 415 in operating parameter database 170. It will be appreciated that in different embodiments, various operating parameters, including temperatures, actual mileage, tread depth, tire load, speed, vehicle/tire acceleration (lateral, longitudinal and vertical), etc., may be measured and/or communicated to system 130 in an automated fashion, while other operating parameters may be collected and/or communicated to system 130 in a manual fashion. For example, in one non-limiting embodiment, temperature values may be collected and communicated in an automated fashion while other operating parameters, such as actual mileage and/or tread depth, may be collected by a technician when a vehicle is stopped, and then manually input into system 130.

Generating an Alert Based on the Tire Health Parameter for the Tire

Figure 6:
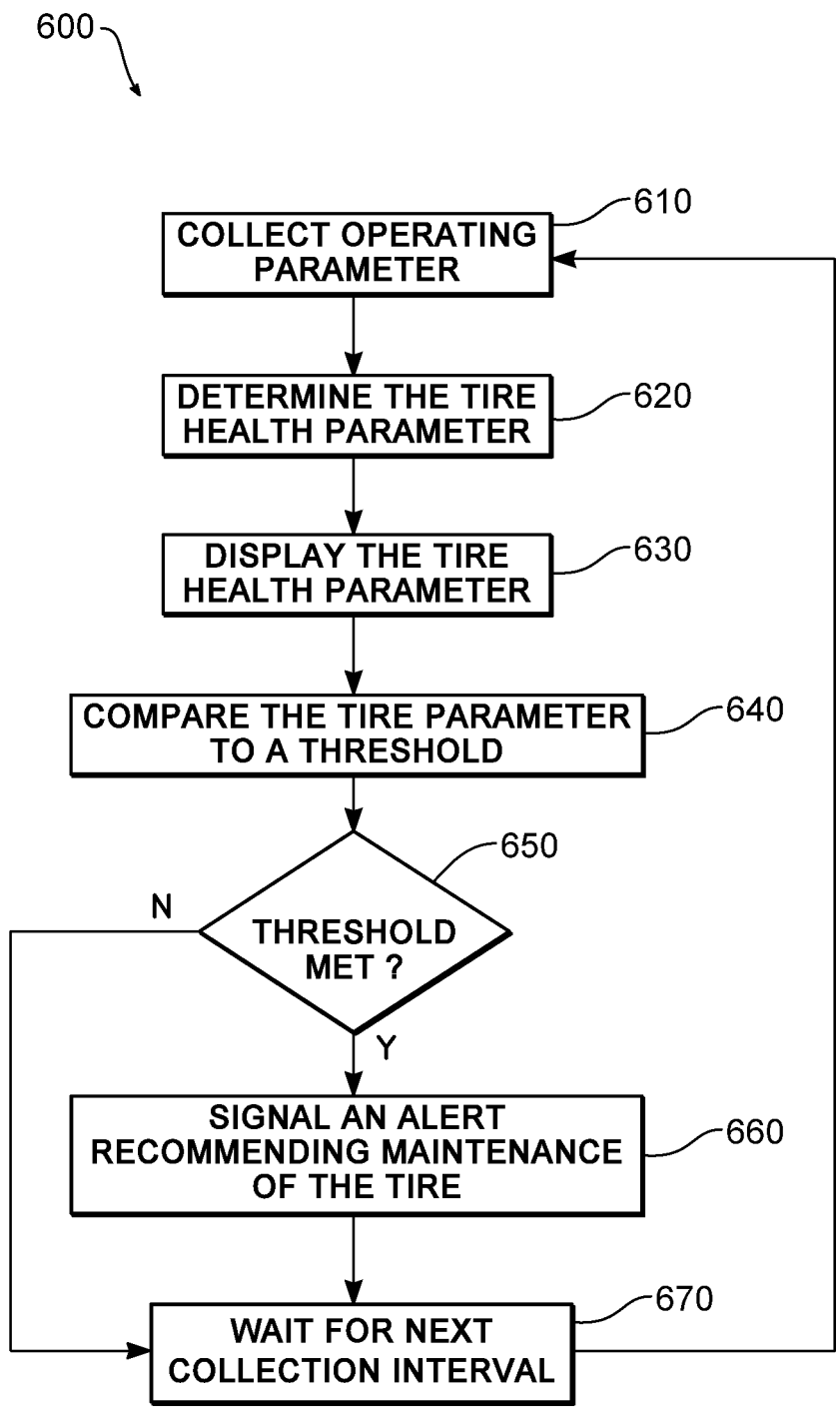
FIG. 6 shows a flow chart illustrating a method of generating an alert based on the tire health parameter for the tire, in accordance with embodiments of the present invention.

Embodiments consistent with the invention may also generate an alert based on the tire health parameter for the tire. One such implementation of generating an alert, specifically in the application of a centralized tire health monitoring device for determining the health of a tire is illustrated by function 600 in FIG. 6.

Function 600 includes steps 610-650, which are typically implemented in a computer, e.g., via software and/or hardware such as within tire health monitoring system 130 and tire characterization computing device 310 of FIGS. 1, 2, and 3. In some embodiments, all or a portion of the functionality in these steps may be implemented in an on-board computer or programmable electronic device disposed on the vehicle, or in other manners that will be appreciated by one of ordinary skill in the art having the benefit of the instant disclosure.

In step 610, tire health monitoring system 130 may collect operating parameters that have been collected from the tire as the tire has been exposed to the actual operating conditions for a collection interval determined by tire health monitoring system 130. For example, tire health monitoring system 130 may determine that the collection interval for the tire is based on the actual mileage logged by the tire. Tire health monitoring system 130 may determine that the collection interval is based on every 5,000 actual miles logged by the tire. In such an example, the actual mileage for the tire may be approaching 50,000 actual miles. Tire health monitoring system 130 may collect operating parameters collected from the tire during the actual miles logged by the tire from 45,000 actual miles to 50,000 miles. The collection interval may be based on actual miles logged by the tire, a duration of time, and/or any other collection interval that operating parameters may be collected during such an interval as will occur to those of skill in the art.

In step 620, the tire health parameter may be determined based on the operating parameters collected during the collection interval along with various parameters, variables, and/or constants generated during tire characterizations as noted in detail above. The tire health parameter may be an indicator of the health of the tire relative to the tire health parameter that was previously generated for the tire. For example, the tire health parameter for the tire may be generated in 5,000 actual mileage intervals logged by the tire. The tire health parameter determined in step 620 for 50,000 actual miles logged by the tire may be relative to the last tire health parameter determined for 45,000 actual miles logged by the tire. The tire health parameter determined for 50,000 actual miles may be an indicator as to the rate of change for the tire based on the comparison to the tire health parameter determined for 45,000 actual miles. The tire health parameter may be based on any type of parameter that can adequately address the current health of the tire as will occur to those of skill in the art.

In step 630, the tire health parameter is displayed to an operator and/or owner of vehicle 180 that operates with the tire. For example, the tire health parameter may be displayed to the operator of the vehicle 180 by tire health monitoring system 130 via dashboard display cluster 230 in the vehicle 180. In another example, the tire health parameter may be displayed to the owner of the vehicle 180 at a location remote from the vehicle 180 where tire health monitoring system 130 may be located. The tire health parameter may be displayed in any location where personnel that would be interested in knowing the tire health parameter as will occur to those of skill in the art.

In step 640, tire health monitoring system 130 compares the tire health parameter to a threshold. The threshold of the tire is a value for the tire health parameter that is indicative that the condition of the tire is in a state that requires action to be taken by the operator and/or owner of the tire. The threshold of the tire may be based on the maintenance milestones provided by the manufacturer of the tire. As noted above, the tire health parameter may include an equivalent mileage for the tire. The equivalent mileage for the tire is compared to a threshold mileage that is indicative that a maintenance milestone has been attained by the equivalent mileage requiring the operator and/or owner to take the maintenance action associated with the maintenance milestone.

For example, the manufacturer of the tire may recommend that a maintenance milestone of removing the tire from vehicle 180 at 50,000 miles. As a result, tire health monitoring system 130 may set the threshold at 50,000 miles so that the tire may be removed from vehicle 180 when the equivalent mileage is at 50,000 miles. The threshold may also be adjusted by the owner and/or operator of the tire so that the threshold is customized to the actual operating conditions that the tire is exposed to and also the operations of the owner and/or operator. For example, the owner and/or operator may not be able to take the tire out of service when the equivalent mileage for the tire reaches a maintenance milestone. Rather, the owner and/or operator may have to plan to service the tire and can set the threshold based on those operational needs. The threshold may be based on any type of metric and adjusted in any fashion so that the health of the tire may be adequately addressed as will occur to those of skill in the art.

In step 650, tire health monitoring system 130 determines whether the threshold has been met by tire health parameter. Tire health monitoring system 130 may determine whether the threshold has been met based on a logic 0 or a logic 1 decision. Tire health monitoring system 130 may determine the threshold has been met when the threshold has been exceeded by the tire health parameter where tire health monitoring system 130 generates a logic 1 decision indicating that the threshold has been exceeded. Tire health monitoring system 130 may determine that the threshold has not been met when the tire health parameter remains under the threshold where tire health monitoring system 130 generates a logic 0 decision indicating that the threshold has not been exceeded.

Tire health monitoring system 130 may also determine whether the threshold has been met based on whether the tire health parameter is within a designated amount from the threshold. For example tire health monitoring system 130 may determine that the threshold has been exceeded when the tire health parameter is within +/−5% of the threshold. Tire health monitoring system 130 may determine that the threshold has not been met when the tire health parameter is greater than 5% (−5%) from the threshold. Tire health monitoring system 130 may determine whether the threshold has been met based on any type of process so that the health of the tire may be adequately addressed as will occur to those of skill in the art.

In step 660, tire health monitoring system 130 signals an alert when the threshold has been satisfied by the tire health parameter. The operator and/or owner of the tire are alerted when the threshold has been satisfied by the tire health parameter so that the operator and/or owner are aware that action is recommended to service the tire. For example, the tire has a maintenance milestone that recommends that the tire be removed from vehicle 180 when the mileage for the tire exceeds 50,000 miles. Tire health monitoring system 130 compared the equivalent mileage determined for the tire as 60,000 miles to the threshold of 50,000 miles. The equivalent mileage of 60,000 miles exceeds the threshold of 50,000 miles. Although the actual mileage for the tire is 40,000 miles, tire health monitoring system 130 signals an alert recommending that the tire be removed from the vehicle 180 based on the equivalent mileage of 50,000 exceeding the threshold of 40,000 miles.

If the threshold has been determined to not be met in step 650, or after completion of step 660, control passes to step 670 to wait for the next collection interval. As noted above, the collection interval is an interval in which the operating parameters are collected from the tire. Tire health monitoring system 130 may wait for the operating parameters to be collected from the tire during the next collection interval. After the operating parameters have been collected for the next collection interval, tire health monitoring system 130 may repeat steps 610-650 to determine whether the newly calculated tire health parameter associated with the next collection interval maintenance should be recommended.

Tire Health Monitoring Network Environment

Figure 7:
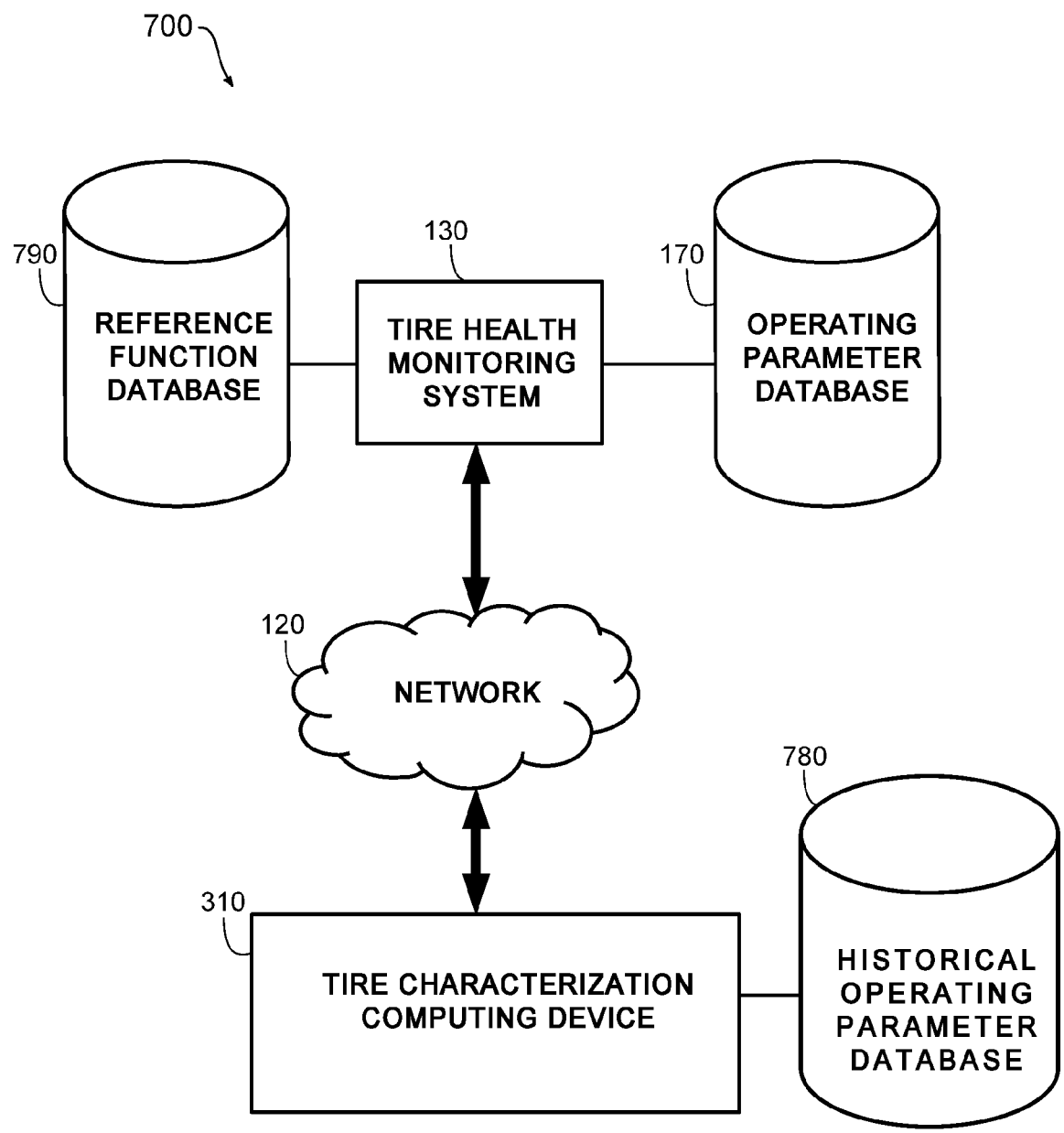
FIG. 7 is a functional diagram of an exemplary tire health monitoring network environment according to embodiments of the present invention.

For further explanation, FIG. 7 sets forth a functional block diagram of an example tire health monitoring network environment 700 according to embodiments of the present invention. Tire health monitoring network environment 700 includes a tire health monitoring system 130, a network 120, tire characterization computing device 310, operating parameter database 170, a historical operating parameter database 780, and a reference function database 790.

The actual structural state of the tire may be a representation of the condition of the tire based on the exposure of the tire to actual operating conditions. The actual structural state of the tire may be determined based on the monitoring of the operating parameters. For example, the actual structural state of the tire may be determined by monitoring the cavity air temperature of the tire. The cavity air temperature of the tire may be related to the condition of the tire in that the condition of the tire is affected with increased cavity air temperatures which also results in an increased actual structural state of the tire.

In some embodiments, the equivalent mileage may correspond to the actual structural state of the tire. Tire health monitoring system 130 may determine the actual structural state of the tire based on the monitored operating parameters. Tire health monitoring system 130 may then determine the equivalent mileage for the tire based upon the actual structural state of the tire using a reference function that relates structural state to mileage under nominal operating conditions. The reference function may incorporate reference structural states for reference tires where each reference tire includes design specifications similar to the tire. The reference function may predict a corresponding mileage for each reference structural state incorporated into the reference function. Each corresponding mileage predicted by the reference function is a function of the reference structural states incorporated into the reference function. Tire health monitoring system 130 may determine the equivalent mileage for the tire based on the mileage that corresponds to the actual structural state provided by the reference function. Tire health monitoring system 130 may assess the condition of the tire based on the equivalent mileage of the tire.

The actual operating parameters monitored by tire health monitoring system 130 may provide a metric that represents the exposure of the tire to the actual operating conditions. The actual operating parameters may be correlated to the actual structural state of the tire where the condition of the tire is affected when exposed to actual operating conditions represented by the actual operating parameters. As a result, the actual structural state of the tire may be based on the actual operating parameters monitored from the tire. For example, operating parameters monitored from the tire regarding the cavity air temperature of the tire as the tire is exposed to actual operating conditions corresponds to the actual structural state of the tire. In such an example, the condition of the tire is affected at a quicker pace when the tire is subjected to increased cavity air temperatures. Thus, tire health monitoring system 130 determines the actual structural state of the tire from the actual operating parameters monitored from the tire regarding the cavity air temperature of the tire. Tire health monitoring system 130 may determine the actual structural state of the tire based on the air cavity temperatures stored in operating parameter database 170.

In an embodiment, tire health monitoring system 130 may determine the actual structural state of the tire based on actual operating parameters that include the cavity air temperatures and/or any other operating parameters that may be used to determine the actual structural state of the tire as will occur to those of skill in the art.

In an embodiment, tire health monitoring system 130 may determine an equivalent mileage for the tire based upon the monitored operating parameters. As noted above, the equivalent mileage of the tire may be an adjustment to the actual mileage of the tire to account for the change in the condition of the tire that corresponds to the actual structural state of the tire due to exposure to actual operating conditions. Tire health monitoring system 130 may determine the equivalent mileage for the tire based on a reference function for the tire.

The reference function may relate structural state to mileage under nominal operating conditions. The reference function may predict a corresponding mileage for each determined structural state of the tire. The reference function may include reference structural states relative to the tire where each reference structural state has a corresponding reference mileage associated with it. Each reference structural state may be determined for several different reference tires with design specifications similar to the tire. Corresponding actual mileages are then recorded for each reference structural state of each reference tire. The reference function may then be derived from each reference structural state of each reference tire with each corresponding actual mileage.

The reference function may provide a reference structural state that may be substantially equivalent to the actual structural state of the tire. Tire health monitoring system 130 may then determine the equivalent mileage for the tire based on the reference mileage provided by the reference function that corresponds to the reference structural state included in the reference function that may be substantially similar to the actual structural state for the tire. For example, tire health monitoring system 130 determines an actual structural state for the tire based on the actual operating parameters. The reference function for the tire provides a reference structural state that is substantially similar to the actual structural state of the tire. Tire health monitoring system 130 may then determine that the corresponding mileage provided by the reference function for the reference structural state that is substantially similar to the actual structural state of the tire is 55,000 miles. Tire health monitoring system 130 may then determine that the equivalent mileage for the tire is 55,000 miles.

In an embodiment, the reference function may provide a suitable model for the tire in that the reference structural state included in the reference function may be substantially similar to the actual structural state of the tire. The condition of the tire associated with the reference structural state may then be an adequate representation of the condition for the tire. Thus, the reference mileage corresponding to the reference structural state provided by the reference function may be adequately suitable representation of the equivalent mileage for the tire.

Tire health monitoring system 130 may determine reference structural states for several reference tires based on exposure of the reference tires to historical operating conditions. The reference tires may be selected so that the reference tires have similar design specifications to the tire so that the structure of each reference tire is similar to the structure of the tire. Selecting reference tires with similar design specifications to the tire may provide an accurate representation of the condition of the tire based on the reference structural state of each reference tire.

For example, the tire is associated with a delivery truck and includes design specifications suitable to handle the operating conditions that the tire engages when associated with the delivery truck. Tire health monitoring system 130 may determine reference structural states for reference tires that also include design specifications suitable to handle the operating conditions that the reference tires engage when associated with delivery trucks. The reference tires may include but are not limited to reference tires of the same make and model as the tire, similar design specifications as the tire but of different make and model, the same fleet of vehicles as the tire, the same vehicle as the tire, and/or any other type of reference tire will occur to those of skill in the art.

The historical operating conditions may also be selected so that the reference tires are exposed to operating conditions similar to the actual operating conditions that the tire is exposed to when determining the reference structural state of each reference tire. Predicting operating conditions similar to the actual operating conditions may also provide an accurate representation of the condition of the tire based on the reference structural state of each reference tire.

As noted above, tire health monitoring system 130 may determine the reference structural state for each reference tire based on historical operating parameters stored in historical operating parameter database 780. Tire characterization computing device 310 may retrieve historical operating parameters from historical tire data database 780 and provide the historical operating parameters to tire health monitoring system 130 via network 120. The historical operating parameters may be monitored from the reference tires and stored in historical operating parameter database 780 as each reference tire is exposed to the reference operating conditions.

The historical operating parameters may be correlated to the reference structural state of each reference tire where the condition of each reference tire deteriorates when exposed to the reference operating conditions represented by the historical operating parameters. As a result, the reference structural state of the tire may be based on the historical operating parameters monitored for each reference tire. The historical operating parameters may represent similar operating conditions as the actual operating parameters and as a result may provide similar insight as to the condition of each reference tire as the actual operating parameters do for the tire. For example, the historical operating parameters may represent the temperatures that each reference tire is exposed to and/or any other operating parameters that may be representative and/or correlated to the condition of the tire as will occur to those of skill in the art.

Tire characterization computing device 310 may record each actual mileage for each reference tire at each determined reference structural state where each recorded actual mileage is the reference mileage. Tire characterization computing device 310 may record the mileage for the reference tire at the time the reference structural state is determined thus providing a reference mileage associated with each determined reference structural state. Tire characterization computing device 310 may record the mileage provided by a measuring device, such as an odometer for example, that continuously measures the mileage for the reference tire. Tire health monitoring system 130 may then store each determined reference structural state and each corresponding reference mileage for each reference tire in reference function database 790 as provided by tire characterization computing device 310 via network 120. When queued, reference function database 790 may provide each reference structural state with each corresponding reference mileage for each reference tire.

Tire health monitoring system 130 may generate the reference function based on each reference structural state and each corresponding reference mileage that is incorporated into the reference function. Tire health monitoring system 130 may also determine which reference structural states to include in the reference function in order to customize the reference function to the tire. For example, tire health monitoring system 130 may select reference structural states with corresponding reference mileages associated with reference tires included in the same fleet as the tire. Tire health monitoring system 130 may generate the reference function to include reference structural states that increase in magnitude such that each corresponding reference mileage also increases in magnitude. As noted above, tire health monitoring system 130 may then scan the reference function for the reference structural state that is substantially similar to the actual structural state and then determine the equivalent mileage as the reference mileage that corresponds to the reference structural state that is substantially similar to the actual structural state.

As noted above, the reference function generated by tire health monitoring system 130 may provide a suitable model for the tire in that the reference mileage corresponding to the reference structural state provided by the reference function may be an adequate representation of the equivalent mileage for the tire. In an embodiment, tire characterization computing device 310 may progressively accumulate each reference structural state with corresponding reference mileage for each reference tire. Tire health monitoring system 130 may then progressively store each reference structural state with corresponding reference mileage for each reference tire within reference function database 790.

As a result, additional reference structural states with corresponding reference mileages for additional reference tires may continue to accumulate within reference function database 790. Each additional determined reference structural state with corresponding reference mileage for each additional reference tire provides additional a priori knowledge of the condition of the tire. As a result, the greater the amount of reference structural states with corresponding reference mileages determined for additional reference tires may enable tire health monitoring system 130 to generate a reference function that provides reference structural states with corresponding reference mileages that represent the condition of the tire.

For example, simply implementing reference structural states with corresponding mileages from a single reference tire limits the equivalent mileage for the tire as provided by the reference function to the reference mileage of a single reference tire that was exposed to a single set of reference operating conditions. However, implementing structural states with corresponding mileages from additional reference tires enhances the equivalent mileage for the tire as provided by the reference function to the reference mileages of several reference tires that were exposed to several different combinations of reference operating conditions. Thus, the equivalent mileage for the tire as provided by the reference function may be based on a broader set of reference tires.

As noted above, the reference structural states with corresponding reference mileages may be progressively stored in reference function database 790. In an embodiment, the reference structural states with corresponding reference mileages stored in reference function database 790 may be a substantially complete compilation of reference structural states with corresponding reference mileages determined from a substantially complete compilation of reference tires. The substantially complete compilation may include each reference structural state and corresponding reference mileage determined for each reference tire that may have been exposed to the reference operating conditions in the tire manufacturer's facility. Such a compilation may be for the purpose of gathering additional reference structural states and corresponding reference tires in a test environment at the tire manufacture's facility to strengthen the reference function for the tire.

In an embodiment, the substantially complete compilation may also include actual structural states and actual mileages determined for other tires in which tire health monitoring system 130 has determined equivalent mileages. For example, tire health monitoring system 130 may have determined an equivalent mileage for a second tire with substantially similar design specifications as the tire but associated with a vehicle that is included in a different fleet than the tire. Tire health monitoring system 130 has previously determined several actual structural states of the second tire and as noted above, tire health monitoring system 130 has previously determined corresponding equivalent mileages that correspond to the actual structural states of the second tire. Reference function database 790 is updated with each actual structural state and corresponding equivalent mileage previously determined for the second tire.

Reference function database 790 may be progressively updated with reference structural states and corresponding reference mileages for reference tires from individual tire testing centers for the manufacturer of the tire, from individual tire testing centers for the manufacturers of other tires with substantially similar design specifications as the tire, from actual structural states with corresponding equivalent mileages determined for other tires with similar design specifications as the tire, from actual structural states with corresponding equivalent mileages for other tires included in the same fleet as the tire, from actual structural states with corresponding equivalent mileages for other tires associated with the same vehicle as the tire, and/or any other source that determines structural states of other tires with similar design specifications as the tire that will strengthen the reference function for the tire as will occur to those of skill in the art.

In an embodiment, tire health monitoring system 130 may customize the reference function generated for the tire so that the reference structural states and corresponding reference mileages incorporated into the reference function may be customized to the tire. Tire health monitoring system 130 may query reference function database 790 to select which reference tires and which reference structural states with corresponding reference mileages from each selected reference tire to incorporate into the reference function for the tire.

For example, tire health monitoring system 130 may incorporate reference structural states with corresponding reference mileages captured from reference tires in test facilities sponsored by the manufacturer when reference function database 790 fails to include reference structural states with corresponding reference mileages from reference tires that were included in the same fleet as the tire. In such an example, tire health monitoring system 130 may have to retrieve reference structural states with corresponding reference mileages from reference tires tested in the testing facility because reference function database 790 fails to include enough reference structural states with corresponding reference mileages from reference tires included in the same fleet to generate a reference function sufficient for tire health monitoring system 130 to determine an accurate equivalent mileage for the tire.

In another example, tire health monitoring system 130 may limit the reference structural states with corresponding reference mileages captured from reference tires to reference tires included in the same fleet as the tire when reference function database 790 includes a sufficient amount of reference structural states with corresponding reference mileages captured from reference tires included in the same fleet as the tire. The sufficient amount of reference structural states with corresponding reference mileages captured from reference tires included in the same fleet as the tire may generate a reference function that is customized to the tire for tire health monitoring system 130 to determine an accurate equivalent mileage for the tire. In such an example, incorporating reference structural states with corresponding reference mileages captured from reference tires not included in the same fleet as the tire would weaken the reference function of the tire for tire health monitoring system 130 to determine an accurate equivalent mileage for the tire.

Example Computer System for Tire Health Monitoring Network Environment

Figure 8:
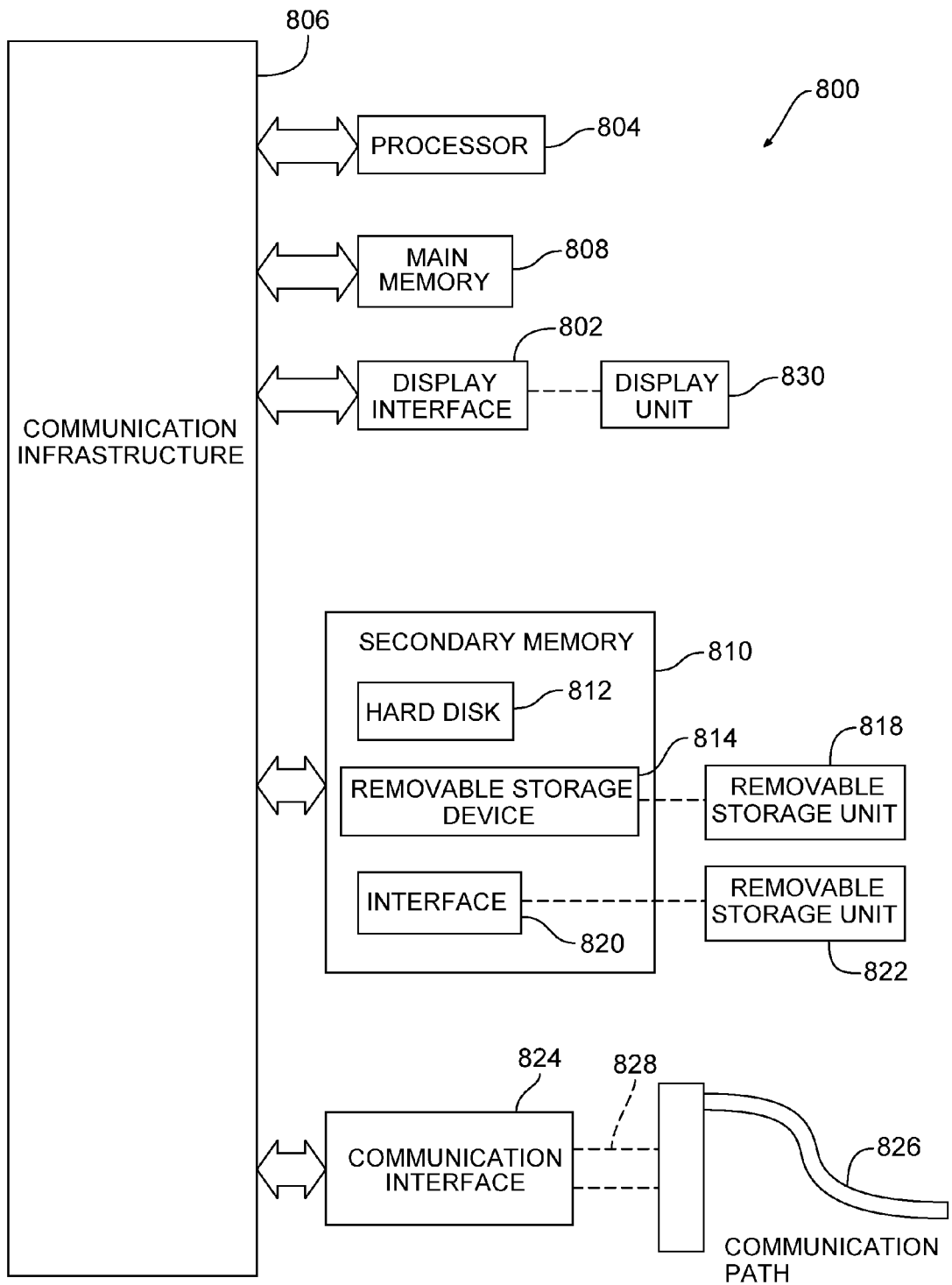
FIG. 8 is a block diagram illustrating an exemplary computer system in which embodiments of the present invention, or portions thereof, may be implemented as computer-readable code.

FIG. 8 illustrates an example computer system 800 in which embodiments of the present invention, or portions thereof, may be implemented as computer-readable code. For example, tire characterization computing device 310 or tire health monitoring system 130 may be implemented on computer system 800 using hardware, software, firmware, tangible computer readable media having instructions stored thereon, or a combination thereof and may be implemented in one or more computer systems or other processing system.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons skilled in the relevant art, a computing device having at least one processor device, such as processor device 804, where the processor device may be a single processor, a processors, a processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may include a floppy disk drive, a magnetic tape drive, an optical disk drive, a flash memory, or the like. The removable storage drive 814 reads and/or writes to a removable storage unit 818 in a well-known manner. Removable storage unit 818 may include a floppy disk, magnetic tape, optical disk, etc. which is read by and written to by removable storage drive 814. As will be appreciated by persons skilled in the relevant art, removable storage unit 818 includes a computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interfaces 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826.

In this document, the terms "computer program storage medium" and "computer usable storage medium" are used to generally refer to storage media such as removable storage unit 818, removable storage unit 822, and a hard disk installed in hard disk drive 812. Computer program storage medium and computer usable storage medium may also refer to memories, such as main memory 808 and secondary memory 810, which may be memory semiconductors (e.g. DRAMS, etc.).

Computer programs (also called computer control logic) are stored in main memory 808 and/or secondary memory 810. Computer programs may also be received via communications interface 824. Such computer programs, when executed, enable computer system 800 to implement embodiments as discussed herein. In particular, the computer programs, when executed, enable processor device 804 to implement the processes of the disclosure, such as the stages in the method illustrated by flowchart 400 of FIG. 4 discussed above. Accordingly, such computer programs represent controllers of the computer system 800. When an embodiment is implemented using software, the software may be stored in a computer program product and loaded into computer system 800 using removable storage drive 814, interface 820, and hard disk drive 812, or communications interface 824.

CONCLUSION

The foregoing description of the specific embodiments will so fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not limitation, such that the terminology or phraseology of the specification is to be interpreted by the skilled artisan in light of the teachings and guidance.

Therefore, embodiments consistent with the invention may be used to assess a condition of a tire based on previous exposure of the tire to actual operating conditions. In many embodiments, this may permit assessments of the condition of the tire to be based on a tire health parameter that is based upon data relative to operating parameters for the tire over time during usage of the tire. The operating parameters are indicative of the actual operating conditions of the tire. Thus, the tire health parameter is based on the actual operating conditions of the tire rather than an actual mileage of the tire that may not be an accurate representation of the condition of the tire.

The breadth and scope of the present invention should not be limited by any of the above-described exemplary embodiments, but should be defined only in accordance with the claims and their equivalents.

What is claimed is:

1. A method of assessing a condition of a tire on a vehicle, the tire belonging to a tire model, the method comprising:
   providing at least one temperature sensor in the tire;
   collecting data associated with a plurality of operating parameters over time during usage of the tire as the tire is exposed to actual operating conditions, wherein the collecting further includes:
       periodically measuring a cavity air temperature present in an interior of the tire during usage of the tire as the tire is exposed to actual operating conditions, to thereby generate data on a cavity air temperature history during usage of the tire;
       periodically measuring an ambient air temperature located outside the interior of the tire during usage of the tire as the tire is exposed to actual operating conditions, to thereby generate data on an ambient air temperature history during usage of the tire; and
       measuring a duration of usage of the tire in actual operating conditions;
   calculating a belt edge temperature at a belt edge area within the tire over time during usage of the tire as the tire is exposed to actual operating conditions, based on a first formula using the cavity air temperature and ambient air temperature, thereby generating a belt edge temperature history during usage of the tire, wherein the first formula is the following:

$$T_{be} = a*T_{cav} + b*T_{amb}$$

wherein $T_{be}$ is the belt edge temperature, $T_{cav}$ and $T_{amb}$ are the cavity air temperature and the ambient air temperature that have been measured periodically, and a and b are tire model-specific coefficients determined during a tire characterization of the tire model prior to exposure of the tire to actual operating conditions;
   determining a tire health parameter for the tire that provides an indication of accumulated damage and wear for the tire based upon a second formula using the belt edge temperature history and the duration of usage of the tire during usage of the tire as the tire is exposed to actual operating conditions as well as additional tire-model specific coefficients determined during the tire characterization of the tire model;
   displaying the tire health parameter to an operator or owner of the vehicle to provide a predictive indication of when maintenance will be required on the tire.

2. The method of claim 1, wherein the tire health parameter includes an equivalent mileage for the tire.

3. The method of claim 1, wherein the tire model-specific coefficients vary with respect to tread depth of the tire such that the first formula for calculating the belt edge temperature of the tire is the following:

$$T_{be}(TD) = a(TD)*T_{cav} + b(TD)*T_{amb},$$

wherein TD is tread depth, $T_{be}(TD)$ is a belt edge temperature value as a function of the tread depth, and a(TD) and b(TD) are model-specific cavity air and ambient functions of the tread depth, which are determined during the tire characterization of the tire model.

4. The method of claim 1, further comprising:
   determining the tire health parameter in part based on a nominal tire health parameter determined during the tire characterization of the tire model.

5. The method of claim 1, wherein the tire health parameter is determined in part based on a reference belt edge temperature constant determined during the tire characterization of the tire model.

6. The method of claim 1, wherein the tire health parameter is determined in part based on an activation energy constant determined during the tire characterization of the tire model.

7. The method of claim 1, wherein the second formula is the following:

$$D = \int \frac{dD}{dn}\bigg|_0 e^{\frac{E_a(T_{be}-T_0)}{R_{gc}(T_{be}T_0)}} dn,$$

wherein D is the tire health parameter, $T_{be}$ is the belt edge temperature, $T_0$ is a reference temperature value, $E_a$ is an activation energy value, $R_{gc}$ is a gas constant, n is actual mileage defined by the duration of usage of the tire, and $dD/dn|_0$ is a nominal tire health constant.

8. The method of claim 1, further comprising:
comparing the tire health parameter to a threshold value indicating a need for maintenance of the tire; and
generating an alert for the owner or operator of the vehicle if the tire health parameter is beyond the threshold value.

* * * * *